United States Patent [19]  [11]  4,259,406
Borrelli  [45]  Mar. 31, 1981

[54] METHOD FOR PRODUCING SELECTIVELY TINTED PHOTOCHROMIC GLASS LENS AND PRODUCTS

[75] Inventor: Nicholas F. Borrelli, Elmira, N.Y.

[73] Assignee: Corning Glass Works, Corning, N.Y.

[21] Appl. No.: 95,434

[22] Filed: Nov. 19, 1979

[51] Int. Cl.³ .................................. C03C 23/00
[52] U.S. Cl. ............................ 428/410; 65/30 R; 65/31; 65/33; 65/DIG. 2; 106/52; 106/53; 106/DIG. 6; 428/913; 106/54
[58] Field of Search ........... 65/30 R, 31, 33, DIG. 2; 106/53, DIG. 6, 54, 52; 428/913, 410

[56] References Cited

U.S. PATENT DOCUMENTS

| | | | |
|---|---|---|---|
| 3,892,582 | 2/1974 | Simms | 106/52 |
| 3,920,463 | 11/1975 | Simms | 106/54 |
| 4,036,624 | 7/1977 | Krohn et al. | 65/30 R |
| 4,072,490 | 2/1978 | Illig | 65/30 R |
| 4,118,214 | 10/1978 | Wedding | 65/30 R |
| 4,160,655 | 7/1979 | Kingsbury et al. | 65/30 R |

*Primary Examiner*—Arthur D. Kellogg
*Attorney, Agent, or Firm*—Kees van der Sterre; Clinton S. Janes, Jr.

[57]  ABSTRACT

Selectively tinted photochromic glass lenses, such as photochromic lenses with a fixed tint gradient in transmittance ranging from a dark tint at the top of the lens to pale or no tinting at the bottom of the lens, are provided by a process comprising surface coloration and subsequent selective colored surface layer removal, without introducing optical aberrations into the lenses.

6 Claims, No Drawings

METHOD FOR PRODUCING SELECTIVELY TINTED PHOTOCHROMIC GLASS LENS AND PRODUCTS

BACKGROUND OF THE INVENTION

The present invention is in the field of photochromic glasses and particularly relates to photochromic glasses exhibiting surface coloration produced by reducing atmosphere heat treatments, and methods for modifying the surface coloration of such glasses.

The development of surface coloration in silver halide-containing photochromic glasses by reducing atmosphere heat treatments, i.e., by heating the glasses under reducing conditions, is disclosed in U.S. Pat. Nos. 3,892,582 and 3,920,463. Such development is thought to involve the partial reduction of $Ag^+$ in the glass to metallic silver, with the metallic silver acting to provide color centers in the glass which absorb light in the 430–460 nm range, thereby imparting a yellow-to-brown color to the glass.

Glasses which exhibit selective tinting or coloration, i.e., coloration only at specific locations or colored regions forming a design, are of interest for a number of applications. Even in the opthalmic field, opthalmic lenses referred to as gradient lenses which are tinted at the top of the lens and clear at the bottom, are finding commercial acceptance.

If the field of photochromic glasses, efforts have been directed toward the development of lenses which photochromically darken in the top portion only, thus providing a gradient darkening behavior. Examples of methods for producing such lenses are found in U.S. Pat. Nos. 4,036,624, 4,062,490 and 4,160,655.

A particularly desirable product would be a photochromic ophthalmic lens exhibiting a fixed tint gradient in combination with uniform photochromic darkening behavior. Such a lens would darken uniformly in bulk upon exposure to actinic radiation and fade in the absence thereof, and would additionally have an invariant fixed tint gradient or other selectively applied color pattern superimposed on the lens which would not change in response to changes in lighting conditions. In this way a lens exhibiting a photochromic darkening in all lens portions and also a gradient which would always be apparent to the observer, could be provided. Important requirements of such a lens would be relatively uniform photochromic darkening capability, a fixed-tint gradient or other selective coloring pattern, and freedom from refractive power aberrations caused by the lens fabrication procedure. Of course, processes risking the introduction of variations in surface smoothness or curvature which could affect the optical properties of the lens would be unacceptable for both sunglass and prescription ophthalmic lens products.

SUMMARY OF THE INVENTION

The present invention is founded upon the discovery that the coloration which is normally imparted to photochromic glasses by reducing atmosphere heat treatments, hereinafter also referred to as reduction heat treatments, is sufficiently close to the surface of the glass tint selective removal of portions of the colored glass surface can be accomplished without unacceptably altering the optical properties of that surface. Thus it has been found that the colors resulting from such treatments ordinarily reside in a very thin layer, typically of about 10–100 microns thickness, on the surface of a treated glass lens, and that the removal of this surface layer by chemical means does not noticeably affect the refractive power of the lens surface or the surface quality.

In one aspect, then, the present invention includes a method for making a selectively tinted photochromic ophthalmic lens which comprises the steps of, first, heating the lens under reducing conditions to provide a colored surface layer on at least a portion of the lens surface, and thereafter chemically removing selected regions of the colored surface layer to modify the apparent color of that layer and thus the glass lens. The portion of the colored surface layer chemically removed from the lens can be selected to provide a color design, or preferably, a color gradient which could range from relatively intense color at the top of the lens to no color at the bottom. The portion removed can also be controlled as to thickness, so that color modification can constitute either a limited reduction in color intensity or complete removal of the color.

Another aspect of the invention is that, following the chemical removal of selected portions of the colored surface layer of the lens, to modify the apparent color thereof, the lens can be reheated under reducing conditions to impart further color to the lens surfaces or portions thereof. In this way, color patterns or gradients made up of regions which are quite different in color may be provided.

The above-described selected tinting methods can be employed with any of the surface colored photochromic ophthalmic lenses produced by reduction heat treatments in accordance with the prior art. In addition, they can be used with particular advantage to modify the color of certain recently developed surface-colored photochromic glasses. Such glasses include the surface-colored photochromic glasses described in the copending, commonly assigned application of N. F. Borelli et al., Ser. No. 095,435, and the highly light-absorbing surface-colored photochromic glasses described in the copending, commonly assigned application of B. Wedding, Ser. No. 095,436, both concurrently filed herewith.

DETAILED DESCRIPTION

The introduction of surface coloration into silver halide-containing photochromic glass articles such as photochromic lenses by heating under reducing conditions ordinarily comprises exposing the lenses to a reducing atmosphere, containing forming gas, hydrogen, cracked ammonia or the like, at temperatures in the range of about 200°–650° C. for times sufficient to impart the desired surface coloration thereto. Improved methods for providing such coloration are described by Borrelli et al. and Wedding in their above-noted, concurrently filed copending patent applications, and those applications are expressly incorporated herein by reference for a complete description of the preferred surface coloring processes and products.

The composition of photochromic lenses to be treated in accordance with the invention is relatively unimportant. However, the commercially available silver halide-containing photochromic glass lenses disclosed in the aforementioned concurrently filed Borrelli et al. and Wedding applications are boroaluminosilicate glasses which are not only amenable to surface coloration but also exhibit at least some solubility in acidic media containing $F^-$ ions. Since such media can conveniently serve as chemical agents for selectively removing surface material from colored lenses, these commercial photochromic lenses are preferred for use in the invention. It is particularly preferred that the surface colored photochromic lens to be subjected to the chemical removal step of the process be one wherein the colored surface layer has a depth not exceeding about 100 microns, in order to minimize the effects of color layer removal on lens surface smoothness.

The identity of the chemical used for selective surface removal is not critical. Any agent which is effective to dissolve the selected photochromic glass without introducing surface defects such as frosting or pitting may be used. Preferred agents for use with silicate photochromic glasses of commercial composition are aqueous solutions of HF.

The rate of surface removal from the glass can be controlled by controlling the composition of the removal medium, for example, by dilution or by the introduction of modifying acids, salts or the like, and also by controlling the temperature of the medium during the removal step. Routine variations of these parameters can readily provide conditions suitable for extremely rapid removal of colored surface glass, e.g., total color layer removal within seconds, or a relatively slow dissolution rate requiring many minutes for complete color layer removal.

Control over the area or configuration of the surface portions to be subjected to chemical removal may be exercised using the various masking techniques commonly employed for the hydrofluoric acid etching of glassware. Such could include the use of paraffin-based masking media, or other methods for preventing contact between the removal medium and the glass surface.

Alternatively, and in accordance with a presently preferred procedure, the lens may be merely partly dipped into the removal medium for a time sufficient to obtain color layer modification or removal and then removed and rinsed to halt the removal process. This technique is particularly useful for producing a gradient tinting effect in a lens because the sharpness of the gradient can readily be controlled by varing the dipping procedure. Hence, a sharp gradient or abrupt change in tint between top and bottom portions of a lens can be obtained by rapid partial immersion, and rapid removal and rinsing after the immersion interval, while a gentle gradient or gradual reduction in tint from upper to lower portions of a lens can be obtained by gradual immersion and withdrawal. The avoidance of a sharp color demarcation line between immersed and non-immersed lens portions in such dipping procedures is aided if the lens is wetted with water prior to dipping.

The invention may be further understood by reference to the following detailed examples thereof.

EXAMPLE 1

A thin photochromic sunglass lens, formed of drawn sheet glass and having a composition, in parts by weight, of about 58.6 parts $SiO_2$, 17.5 parts $B_2O_3$, 11.5 parts $Al_2O_3$, 7.7 parts $Na_2O$, 2.0 parts $Li_2O$, 1.5 parts $K_2O$, 2.2 parts PbO, 0.3 parts Ag, 0.37 parts Cl, 0.13 parts Br, 0.022 parts F, 0.025 parts CuO, 0.150 parts NiO and 0.014 parts CoO, is provided for treatment. This lens is light brown in color in the undarkened state, having a thickness of about 1.5 mm, and being commercially available as Corning Code 8103 glass from Corning Glass Works of Corning, New York.

In order to provide a colored surface layer on this lens, it is heated under reducing conditions by plunging it into a tube furnace containing an atmosphere of 100% hydrogen, operating at a temperature of 550° C., for 30 minutes. It is then removed from the furnace for examination, and is found to exhibit a dark brown surface coloration in transmitted light.

In order to provide a selectively tinted lens from this surface colored lens, a portion of the colored surface layer is chemically removed by first wetting the lens with water and then partly immersing it in an aqueous HF solution containing about 16% HF by weight for an immersion interval of about 2 minutes.

The lens was immersed in the solution to a depth sufficient to cover approximately ½ of the lens, with immersion and withdrawal being controlled so that a relatively gradual transition between the untreated and fully treated sections of the lens surface was obtained.

The product of this treatment was a photochromic sunglass lens exhibiting relatively uniform photochromic darkening upon exposure to ultraviolet light, and also a fixed tint or color gradient, visible in both the undarkened and darkened states, which graded in the undarkened state from relatively dark brown in the top portion of the lens to very pale yellow in the bottom portion thereof. Most importantly, no visually detectable variations in the refractive power of the lens surfaces were observed to result from the step of chemically removing part of the colored surface layer from the lens.

EXAMPLE 2

In order to provide a contrasting color to the bottom portion of a fixed-tint gradient sunglass lens such as provided in accordance with Example 1 above, such a lens may be recolored following the selective removal of the brown surface layer therefrom. For the purpose of recoloring the bottom portion of such a lens, originally pale yellow in color, the entire lens may be reheated under reducing conditions by placing it in a tube furnace containing 100% $H_2$ and operating at a temperature of 350° C. for an interval of 1 hour. If the lens is then removed from the furnace and examined, the bottom portion of the lens will normally be found to exhibit a light purple color in transmitted light, which contrasts strongly with the drak brown color of the top of the lens.

In carrying out a reheating surface coloration step such as just described, it is preferred that the reheating temperature used to provide the second or subsequent colored surface layers on the glass be carried out at a temperature lower than that at which the first or other prior colored surface layers have been applied thereto. This is because the use of a lower heating temperature will ordinarily prevent any modification of the color of previously applied layers, provided that the previous layers were applied at higher temperatures. Thus, in making a multicolor product, the first surface color to be developed in the glass will normally be that color requiring the highest temperature reduction heat treatment, and subsequent colors will be applied in order of decreasing reduction heat treatment temperature.

It is interesting to note that, in the reducing atmosphere heat treatment of photochromic glasses containing PbO, some coloration due to the reduction of PbO to metallic lead can occur during treatment in the manner described in the aforementioned concurrently filed Wedding application. This color is also confined to the glass surface and is removable, being even less penetrating than the silver color. With appropriate control of the surface removal treatment, it is therefore possible to remove the lead coloration from certain surface regions, and the lead and silver colorations from other surface regions, to provide brown, yellow and clear sections in a single glass article with only one heat treatment.

Of course, the foregoing examples are merely illustrative of procedures which could be employed in the production of selectively tinted photochromic glass articles or lens blanks in accordance with the present invention. Thus numerous variations and modifications of these procedures may be resorted to in practicing the invention within the scope of the appended claims.

I claim:

1. A method for making a selectively tinted photochromic glass lens which comprises the steps of:
   (a) heating a silver halide-containing photochromic glass lens under reducing conditions to provide a colored surface layer on at least a portion of said lens; and
   (b) chemically removing at least a portion of said colored surface layer to modify the color of said layer.

2. A method in accordance with claim 1 wherein the photochromic glass lens is composed of a boroaluminosilicate glass.

3. A method in accordance with claim 2 wherein the portion of the colored surface layer is chemically removed by exposing the surface to an aqueous HF-containing solution.

4. A method in accordance with claim 1 which comprises the further step, following the chemical removal of at least a portion of the colored surface layer, of reheating the lens under reducing conditions to provide a second colored surface layer on at least a portion of the surface of the article.

5. A method in accordance with claim 4 wherein the article is reheated under reducing conditions at a temperature below that at which it was first heated under reducing conditions.

6. A selectively tinted photochromic glass lens provided according to the method of claim 1.

* * * * *

UNITED STATES PATENT AND TRADEMARK OFFICE
CERTIFICATE OF CORRECTION

PATENT NO. : 4,259,406
DATED : March 31, 1981
INVENTOR(S) : N. F. Borrelli

It is certified that error appears in the above-identified patent and that said Letters Patent are hereby corrected as shown below:

Column 1, line 25, change first "opthalmic" to -- ophthalmic --.

Column 1, line 25, change second "opthalmic" to -- ophthalmic --.

Column 1, line 63, change "tint" to -- that --.

Column 4, line 46, change "drak" to -- dark --.

Signed and Sealed this

Eighteenth Day of August 1981

[SEAL]

Attest:

GERALD J. MOSSINGHOFF

Attesting Officer

Commissioner of Patents and Trademarks